(12) United States Patent
Kung et al.

(10) Patent No.: US 7,155,443 B2
(45) Date of Patent: Dec. 26, 2006

(54) SYSTEM AND METHOD FOR APPLICATION TEXT LOCALIZATION

(75) Inventors: Ching-Yi Kung, Naperville, IL (US); Bruce DeFrang, Batavia, IL (US); Darrell Kooy, Aurora, IL (US)

(73) Assignee: Computer Associates Think, Inc., Islandia, NY (US)

( * ) Notice: Subject to any disclaimer, the term of this patent is extended or adjusted under 35 U.S.C. 154(b) by 420 days.

(21) Appl. No.: 10/449,221

(22) Filed: May 30, 2003

(65) Prior Publication Data

US 2004/0243615 A1 Dec. 2, 2004

(51) Int. Cl.
*G06F 17/30* (2006.01)
(52) U.S. Cl. .............................. 707/101; 707/102; 704/8
(58) Field of Classification Search ................... 704/8, 704/9; 707/100, 101
See application file for complete search history.

(56) References Cited

U.S. PATENT DOCUMENTS

| | | | |
|---|---|---|---|
| 5,499,335 A | 3/1996 | Silver et al. ................. 715/703 |
| 5,812,390 A | 9/1998 | Merkin | |
| 5,917,484 A | 6/1999 | Mullaney ..................... 715/703 |
| 5,974,372 A | 10/1999 | Barnes et al. ................... 704/8 |
| 6,073,090 A | 6/2000 | Fortune et al. ................. 704/8 |
| 6,119,079 A * | 9/2000 | Wang et al. .................... 704/8 |
| 6,138,086 A * | 10/2000 | Rose et al. ..................... 704/8 |
| 6,396,515 B1 | 5/2002 | Hetherington et al. ...... 715/762 |
| 6,507,812 B1 * | 1/2003 | Meade et al. ................... 704/8 |
| 6,557,005 B1 | 4/2003 | Burget ......................... 707/102 |
| 6,559,861 B1 | 5/2003 | Kennelly et al. ............ 715/703 |
| 6,615,168 B1 | 9/2003 | Resnik et al. ................... 704/8 |
| 6,687,736 B1 | 2/2004 | Lee .............................. 709/203 |
| 6,757,023 B1 | 6/2004 | Chien et al. ................. 348/468 |
| 6,810,414 B1 * | 10/2004 | Brittain ....................... 709/219 |
| 6,873,980 B1 * | 3/2005 | Young et al. ................... 707/1 |
| 6,931,410 B1 * | 8/2005 | Anderson et al. ........... 707/100 |
| 2003/0135511 A1 * | 7/2003 | Anderson et al. ........... 707/101 |

FOREIGN PATENT DOCUMENTS

| | | |
|---|---|---|
| EP | 0 413 486 A2 | 2/1991 |
| EP | 0 875 823 A2 | 11/1998 |

OTHER PUBLICATIONS

"Writing Software for the International Market," Digital Equipment Corporation, Mar. 1996, Internet article retrieved on Jan. 5, 2004, 64 pgs. <http://h30097.www3.hp.com/docs/base_doc/DOCUMENTATION/HTML/AA-QOR4C-TE_html/TITLE.html>.
Copeland, et al., "Work: I18N, part 2," Jul. 1999 (Server/Workstation Expert),XP-002300412, retrieved from the Internet on Oct. 1, 2004, 3 pgs. http://alumnus.caltech.edu/{copeland/work/il8n-b.html>.

\* cited by examiner

*Primary Examiner*—Greta Robinson
(74) *Attorney, Agent, or Firm*—Pillsbury Winthrop Shaw Pittman, LLP

(57) ABSTRACT

A method for application text localization includes retrieving a format string using a string identifier supplied by an application. The format string defines a format of a text string. The method also includes generating the text string using the retrieved format string. In addition, the method includes communicating the generated text string to one or more destinations.

36 Claims, 3 Drawing Sheets

FIG. 3A

| MESSAGE NUMBER | FORMAT STRING |
|---|---|
| 1 | "%V1s %V2s USER %V3s IS IN USER GROUP %V4s" |
| 2 | "%V2c %V1s %V3l DRIVE %V4c CONTAINS FILE %V5s OF %V6lu BYTES" |
| 3 | "THIS DIRECTORY HAS %V1i SUBDIRECTORIES AND %V2i FILES" |

FIG. 3B

| MESSAGE NUMBER | FORMAT STRING |
|---|---|
| 1 | "%V2s %V1s USER GROUP %V4s INCLUDES USER %V3s" |
| 2 | "%V1s %V3l %V2c FILE %V5s CONTAINS %V6lu BYTES AND RESIDES IN DRIVE %V4c" |
| 3 | "THIS DIRECTORY HAS %V1i SUBDIRECTORIES AND CONTAINS %V2i FILES" |

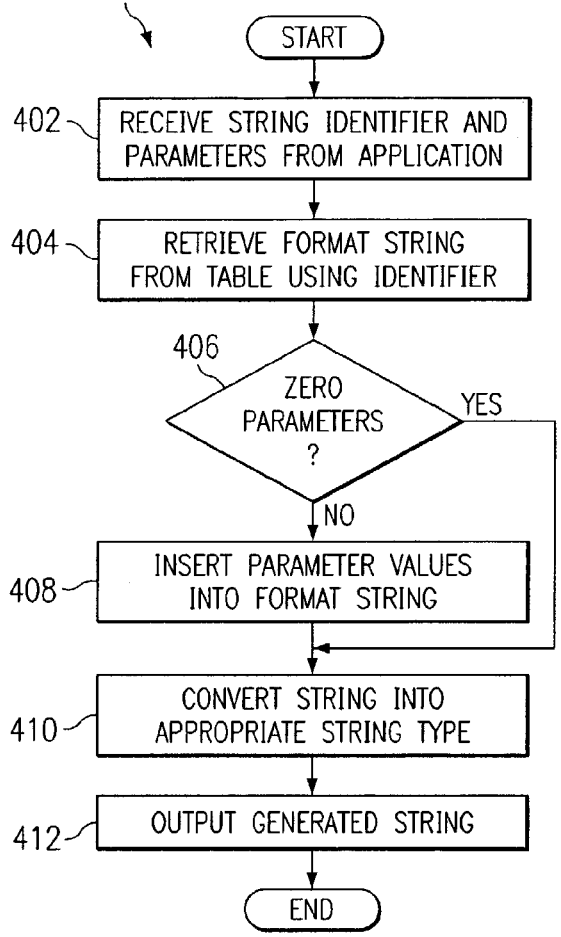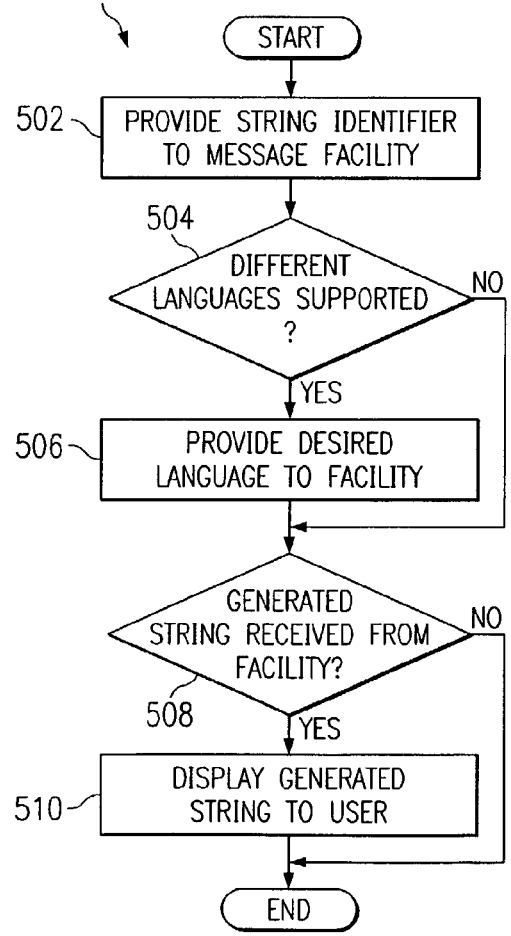

SYSTEM AND METHOD FOR APPLICATION TEXT LOCALIZATION

TECHNICAL FIELD

This disclosure relates generally to the field of computer systems, and more particularly to a system and method for application text localization.

BACKGROUND

Conventional computer applications often need to convey information to a user. For example, the application may generate a display, and the display typically contains text that conveys the information to the user. The application typically uses text strings to generate the display. Text strings used to generate the displays are typically embedded into the actual application code by application programmers.

SUMMARY

This disclosure provides a system and method for application text localization.

In one embodiment, a method for application text localization includes retrieving a format string using a string identifier supplied by an application. The format string defines a format of a text string. The method also includes generating the text string using the retrieved format string. In addition, the method includes communicating the generated text string to one or more destinations.

In a particular embodiment, the format string includes one or more substitution parameters, and the method further includes receiving one or more parameter values. Each parameter value corresponds to one of the substitution parameters. In this embodiment, generating the text string includes replacing each substitution parameter in the format string with the corresponding parameter value.

In another particular embodiment, the format string includes a plurality of substitution parameters and a plurality of variable indicators. In this embodiment, receiving one or more parameter values includes receiving a plurality of parameter values, and each variable indicator identifies the parameter value that corresponds to one of the substitution parameters.

BRIEF DESCRIPTION OF THE DRAWINGS

For a more complete understanding of this disclosure, reference is now made to the following descriptions, taken in conjunction with the accompanying drawings, in which:

FIGS. 3A and 3B are exemplary block diagrams illustrating example string tables supporting application text localization according to one embodiment of this disclosure;

FIG. 4 is an exemplary flow diagram illustrating an example method for application text localization according to one embodiment of this disclosure; and FIG. 5 is an exemplary flow diagram illustrating an example method for supporting text localization at an application according to one embodiment of this disclosure.

DETAILED DESCRIPTION OF EXAMPLE EMBODIMENTS

Figure 1:
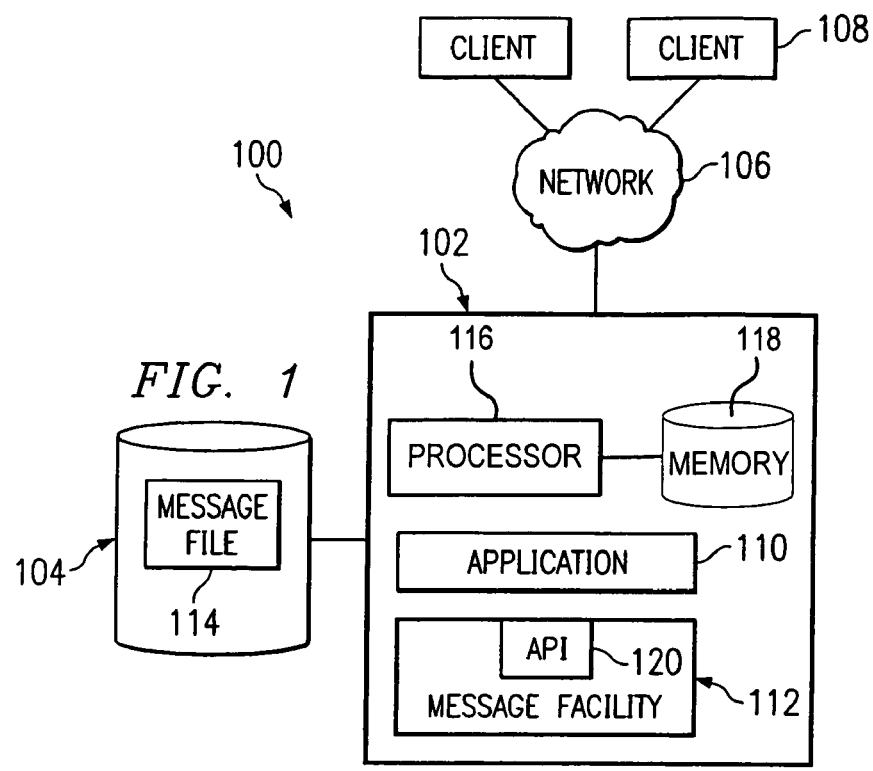
FIG. 1 is an exemplary block diagram illustrating an example system for application text localization according to one embodiment of this disclosure.

FIG. 1 is an exemplary block diagram illustrating an example system 100 for application text localization according to one embodiment of this disclosure. In the illustrated embodiment, system 100 includes a server 102, a database 104, a network 106, and a client 108. Other embodiments of system 100 may be used without departing from the scope of this disclosure.

In one aspect of operation, server 102 executes one or more applications 110. Application 110 may need to generate text strings, such as text strings to be displayed to a user or stored in a log. Application 110 communicates with a message facility 112, and message facility 112 uses an external message file 114 to generate the text strings. By allowing message facility 112 to generate the text strings using an external message file 114, the actual text strings need not be embedded in application 110. This allows the text strings to be modified while reducing or eliminating the need to modify application 110.

In the illustrated embodiment, server 102 is coupled to database 104 and network 106. In this specification, the term "couple" refers to any direct or indirect communication between two or more components, whether or not those components are in physical contact with one another. Also, the term "communication" refers to communication between physically separate components or between components within a single physical unit. Server 102 performs one or more functions to provide services to client 108. For example, server 102 could execute one or more applications 110 on behalf of one or more clients 108. Server 102 may include any hardware, software, firmware, or combination thereof operable to provide services to one or more clients 108.

Database 104 is coupled to server 102. Database 104 stores and facilitates retrieval of information used by server 102. For example, database 104 stores one or more message files 114. Database 104 may include any hardware, software, firmware, or combination thereof operable to store and facilitate retrieval of information. Also, database 104 may use any of a variety of data structures, arrangements, and compilations to store and facilitate retrieval of information.

Network 106 is coupled to server 102 and client 108. Network 106 facilitates communication between components of system 100. For example, network 106 may communicate Internet Protocol (IP) packets, frame relay frames, Asynchronous Transfer Mode (ATM) cells, or other suitable information between network addresses. Network 106 may include one or more local area networks (LANs), metropolitan area networks (MANs), wide area networks (WANs), all or a portion of a global network such as the Internet, or any other communication system or systems at one or more locations.

Client 108 is coupled to network 106. Client 108 performs any of a variety of functions in system 100. For example, client 108 could allow a user to invoke execution of application 110 in server 102. Client 108 may also display information to the user, such as by displaying text strings generated by server 102. Client 108 may include any hardware, software, firmware, or combination thereof operable to communicate with server 102. For example, client 108 could include a web browser, a client application, or other suitable application or logic for communicating with server 102.

In the illustrated example, server 102 includes a processor 116 and a memory 118. Processor 116 executes instructions and manipulates data to perform the operations of server 102. Although FIG. 1 illustrates a single processor 116 in server 102, multiple processors 116 may be used according to particular needs. Memory 118 stores and facilitates retrieval of information used by processor 116 to perform the functions of server 102. Memory 118 may, for example, store instructions to be performed by processor 116 and data used by processor 116. Memory 118 may include any volatile or non-volatile storage and retrieval device or devices.

In the illustrated embodiment, server 102 includes one or more applications 110. Application 110 represents any suitable application, such as a set of instructions, procedures, functions, objects, classes, instances, and related data adapted for implementation in a suitable computer language such as C, C++, Java, or any other appropriate language. In one embodiment, application 110 uses one or more text strings to provide a service to clients 108.

Message facility 112 communicates with application 110 and generates the text strings requested and/or used by application 110. For example, message facility 112 uses one or more message files 114 to generate the text strings. Message file 114 contains one or more format strings, which define the format of one or more text strings. According to one embodiment, the format strings defined in message file 114 could use one or multiple languages. According to another embodiment, system 100 includes multiple message files 114, each including format strings defined in a unique language. Message facility 112 receives information from application 110 identifying the format string to be used to generate a text string. Message facility 112 may also receive parameters identifying values to be inserted into the format string. Message facility 112 then retrieves the format string and generates a text string using the retrieved format string and any parameter values. After that, message facility 112 provides the text string to an appropriate destination. For example, message facility 112 could provide the generated text string to application 110, client 108, a log in server 102 or other component in system 100, or any other suitable destination. Message facility 112 may include any hardware, software, firmware, or combination thereof operable to generate text strings. In one embodiment, message facility 112 represents one or more software routines executed by processor 116.

In the illustrated embodiment, message facility 112 includes an interface 120. Interface 120 represents any suitable interface that allows application 110 or other entity in system 100 to invoke a function of message facility 112. In one embodiment, interface 120 may represent an Application Program Interface (API).

Although FIG. 1 illustrates one example embodiment of a system 100 for application text localization, various changes may be made to system 100. For example, while FIG. 1 illustrates a client-server embodiment, other distributed or non-distributed embodiments may also be used. Also, the functional divisions of server 102 are for illustration only. Components of server 102 could be omitted or combined or additional components can be added according to particular needs.

Figure 2:
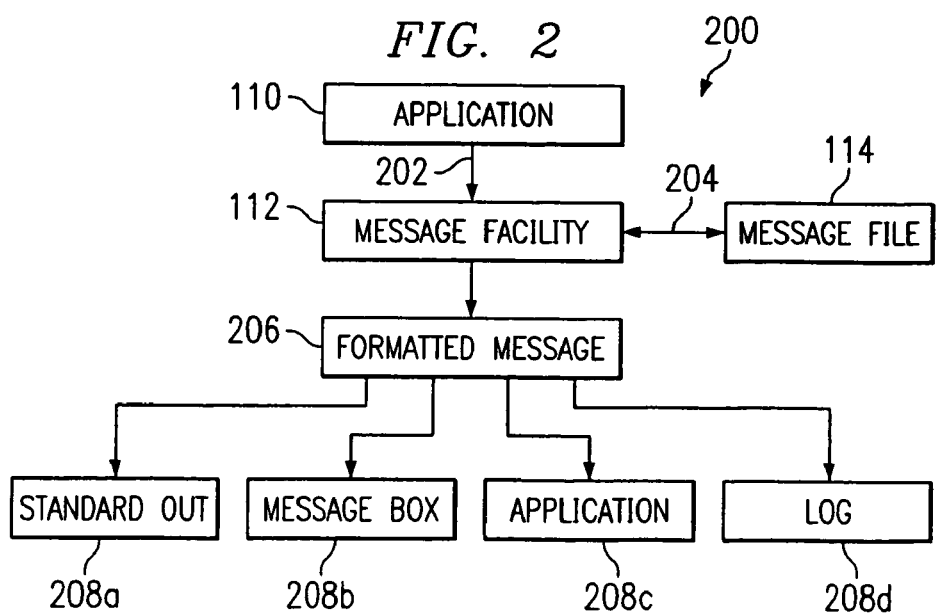
FIG. 2 is an exemplary block diagram illustrating an example data flow supporting application text localization according to one embodiment of this disclosure.

FIG. 2 is an exemplary block diagram illustrating an example data flow 200 supporting application text localization according to one embodiment of this disclosure. Data flow 200 is illustrated with respect to system 100 of FIG. 1. Data flow 200 could also be used in any other suitable system.

To generate a text string, application 110 submits a command 202 to message facility 112. For example, application 110 may submit a command 202 to message facility 112 through interface 120. In one embodiment, the command 202 identifies a format string in message file 114. The command 202 may also include values for one or more parameters, which represent information to be included in the text string. The command 202 could further identify the language to be used when generating the text string.

Message facility 112 receives the command 202 from application 110 and retrieves the identified format string from message file 114 (represented as data flow 204). Message facility 112 uses the retrieved format string to create a text string. For example, the format string may include text and locations where parameter values may be inserted, and message facility 112 inserts the supplied parameter values to create a text string.

Message facility 112 also formats the generated text string into the appropriate string type. For example, message facility 112 may format the string into American Standard Code for Information Interchange (ASCII), Unicode, or Universal character set Transformation Format-8 (UTF8) string representations. In a particular embodiment, each format corresponds to a different command 202. As a particular example, different API functions can be invoked by application 110 in message facility 112, where a function corresponds to each format supported by message facility 112. In this specification, the term "each" refers to each of at least a subset of the identified items.

The text string generated by message facility 112 may then be output by message facility 112 as a formatted message 206. Message facility 112 could provide formatted message 206 to one or multiple output destinations 208. For example, the formatted message 206 could be displayed to a user on a monitor or other standard output destination 208a. The formatted message 206 could also be displayed to a user in a Windows message box 208b. The formatted message 206 could further be presented to an application 208c, which may or may not be the same application 110 that issued command 202. In addition, the formatted message 206 could be placed in a log 208d. The formatted message 206 could be sent to any other or additional destination in system 100. The formatted message 206 could also be used in any other suitable manner.

Although FIG. 2 illustrates one example of a data flow 200 supporting application text localization, various changes can be made to FIG. 2. For example, any number of applications 110 could be in communication with and invoking functions of message facility 110. Also, multiple message files 114 could be used by message facility 112.

FIG. 3 is an exemplary block diagram illustrating example string tables 300a and 300b supporting application text localization according to one embodiment of this disclosure. String tables 300 could, for example, form at least a portion of message file 114 of FIG. 1. In the illustrated example, string tables 300 include entries 302, each entry 302 including a message number 304 and a format string 306. Other embodiments of string tables 300 could be used without departing from the scope of this disclosure.

Message numbers 304 act as an index for entries 302. For example, message facility 112 may use message numbers 304 to locate a specific entry 302 requested by an application 110. In one embodiment, each entry 302 in a table 300 has a unique message number 302.

Format strings 306 identify the formats of various strings that can be generated by message facility 112. As shown in FIG. 3, a format string 306 may include text 308 and/or one or more substitution parameters 310. A substitution parameter 310 represents a location where a value may be inserted into format string 306.

In one embodiment, substitution parameter 310 can represent a string (% s and % S), a pointer (% p and % P), a character (% c and % C), an integer (% i, % o, % d), a long integer (% l), a floating point number (% f), or a double precision floating point number (% e). In a particular embodiment, the string can represent a multi-byte, Unicode, or UTF8 string, and an integer can be declared as unsigned using the u modifier, such as % lu.

As described above, message facility 112 may format a generated text string into one or more string representations, such as ASCII, Unicode, or UTF8 representations. In this embodiment, message facility 112 may treat a parameter value corresponding to a substitution parameter 310 differently depending on the type of string representation being generated. For example, if a Unicode text string is being generated, parameter values for % s strings and % c characters are treated as Unicode, while parameter values for % S strings and % C characters are treated as multi-byte or ASCII values. If an ASCII or UTF8 text string is being generated, parameter values for % s strings and % c characters are treated as multi-byte or ASCII values, while parameter values for % S strings and % C characters are treated as Unicode.

These examples may be used as defaults in system 100, and the defaults may be overridden. For example, a value can be expressly declared to be an ASCII or multi-byte value using the h modifier, such as % hc and % hs. Similarly, a value can be expressly declared to be a Unicode value using the l modifier, such as % lc and % ls. A value can be expressly declared to be a UTF8 value using the $U modifier, such as % $Us. In a particular embodiment, UTF8 characters are not allowed in system 100, but a UTF8 string with one character can be declared using a length specifier (.) followed by the desired length, such as %0.1$Us. These represent example mechanisms for expressly declaring the type for a parameter. Other mechanisms can be used in system 100.

In FIG. 3, both tables 300 use English to define the format strings 306. This is for ease of illustration and explanation only. In a particular embodiment, each table 300 is associated with a different language supported in system 100. In this embodiment, entries 302 with the same message numbers 304 in tables 300 may represent the same text string expressed in different languages.

In one aspect of operation, application 110 can supply a message number 304 to message facility 112. If the desired text message includes one or more parameter values, application 110 can also supply the parameter values to message facility 112. In addition, multiple tables 300 may be used in system 100, such as one table 300 per language supported. In this case, application 110 could further supply the identity of a table 300 to be used, such as by identifying the desired language. Message facility 112 uses the supplied table identity and message number 304 to select an entry 302 in one of the tables 300. Message facility 112 then retrieves the format string 306 from the selected entry 302.

After retrieving a format string 306, message facility 112 inserts the supplied parameter values into the format string 306. In one embodiment, a format string 306 could support the variable ordering of parameters using variable indicators 312 such as, for example, "Vx", where x is a unique identifier. Without using variable indicators 312 in format strings 306, message facility 112 might insert the first parameter value received from application 110 into the first substitution parameter 310. Similarly, message facility 112 inserts the second parameter value received from application 110 into the second substitution parameter 310. In other words, the parameter values received from application 110 are inserted into format string 306 in the order in which they are supplied by application 110.

As shown in FIG. 3, the format strings 306 include variable indicators 312. Variable indicators 312 indicate that the parameter values received from application 110 may be inserted into format string 306 in a different order than the order in which they are supplied by application. In particular, the variable indicators 312 in the first format string 306 of table 300a indicate that the parameter values from application 110 will be inserted into format string 306 in the same order in which they are received. The variable indicators 312 in the first format string 306 of table 300b indicate that the parameter values from application 110 will be inserted into format string 306 in a different order.

The use of variable ordering of parameter values may support the use of different languages in system 100. For example, regarding the third format strings 306 in tables 300, the syntax for both languages may allow the first parameter value to appear first in the text string and the second parameter value to appear second. However, the different syntax for the languages may not allow the parameter values in the first format strings 306 to appear in the same order. Application 110 need not recognize and be programmed to support the different syntax of the languages. Application 110 simply supplies the parameter values to message facility 112, and message facility 112 retrieves the format string 306 for the proper language. The variable indicators 312 in the retrieved format string 306 then help to ensure that the correct parameter values are inserted into the proper locations in the text string.

In one embodiment, tables 300 could form part of message file 114, and message file 114 may reside on any suitable platform. For example, message file 114 could reside on an NT platform or a UNIX platform. In the NT platform, message file 114 could represent a Dynamic Link Library (DLL). In the UNIX environment, message file 114 could represent a res file generated using the eCSrccc compiler.

Although FIG. 3 illustrates example string tables 300 supporting application text localization, various changes may be made to FIG. 3. For example, any suitable number of tables 300 can be used in system 100, including a single table 300. Also, the string formats 306 in tables 300 are for illustration only. Further, tables 300 may include any other or additional information in entries 302.

FIG. 4 is an exemplary flow diagram illustrating an example method 400 for application text localization according to one embodiment of this disclosure. Method 400 is described with respect to system 100 of FIG. 1. Method 400 can also be used by any other suitable system.

Message facility 112 receives a format string identifier and zero or more parameter values from an application 110 at step 402. This may include, for example, application 110 invoking an API function of message facility 112. If multiple languages are supported in system 100, this may also include application 110 providing an identity of the desired language to message facility 112.

Message facility 112 retrieves a format string from message file 114 using the format string identifier at step 404. This may include, for example, message facility 112 accessing a table 300 and selecting an entry 302 having a message number 304 that matches the supplied format string identifier. This may also include message facility 112 retrieving the format string 306 from the selected entry 302. This may further include message facility 112 selecting a particular table 300 based on the desired language of the text string being generated.

Message facility 112 determines whether it received zero parameter values at step 406. This may include, for example, message facility 112 examining the number of parameter values received when application 110 invoked the API function. If at least one parameter value has been supplied, message facility 112 inserts the parameter values into the retrieved format string at step 408. This may include, for example, message facility, 112 determining whether the retrieved format string 306 includes one or more variable indicators 312. This may also include message facility 112 inserting the parameter values into format string 306 at the appropriate locations in the format string 306, such as by replacing substitution parameters 310 with the parameter values.

Message facility 112 converts the text string into the appropriate string type at step 410. This may include, for example, message facility 112 encoding the text 308 in format string 306 and the parameter values differently depending on whether an ASCII, Unicode, or UTF8 string type is desired. In one embodiment, different API functions of message facility 112 correspond to different string types, and the particular string type used in step 410 depends on the function invoked by application 110 at step 402

Message facility 112 outputs the generated text string at step 412. This may include, for example, message facility 112 providing the generated text string to one or multiple output destinations, such as to a monitor or other standard output destination, a Windows message box, an application, or a log.

Although FIG. 4 illustrates one example of a method 400 for application text localization, various changes may be made to method 400. For example, message facility 112 could convert text 308 in format string 306 and the parameter values into the requested string type before inserting the parameter values into the format string 306.

FIG. 5 is an exemplary flow diagram illustrating an example method 500 for supporting text localization at an application according to one embodiment of this disclosure. Method 500 is described with respect to system 100 of FIG. 1. Method 500 can also be used by any other suitable system.

Application 110 provides a string identifier to message facility 112 at step 502. This may include, for example, application 110 invoking an API function in message facility 112. This may also include application 110 determining the type of string to be generated by message facility 112 and invoking the API function associated with that string type.

If multiple languages are supported in system 100 at step 504, application 110 can also provide the identity of the desired language to message facility 112 at step 506. This may include, for example, application 110 supplying a language identifier to message facility 112.

Application 110 determines whether it receives a generated text string from message facility 112 at step 508. For example, the text string may or may not be destined for application 110. If not, method 500 ends. In this case, message facility 112 generates the text string and forwards the string to the appropriate destination. Otherwise, message facility 112 delivers the generated text string to application 110, and application 110 can display or otherwise use the text string at step 510.

Although FIG. 5 illustrates one example of a method 500 for supporting text localization at an application, various changes may be made to method 500. For example, system 100 need not support multiple languages, and steps 504–506 may not be needed.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for application text localization, comprising:
   receiving a requested string type, a string identifier, and one or more parameter values from an application;
   retrieving a format string using the string identifier supplied by the application, the format string including text and one or more substitution parameters;
   generating a text string using the retrieved format string by replacing the one or more substitution parameters in the format string with the one or more parameter values supplied by the application;
   automatically encoding the text string into a string representation by (i) encoding at least the text in the text string according to the requested string type supplied by the application and (ii) encoding at least one of the one or more parameter values in the text string according to a string type different from the requested string type supplied by the application; and
   communicating the string representation to one or more destinations.

2. The method of claim 1, wherein each of the one or more substitution parameters indicates whether that particular substitution parameter should be encoded according to the requested string type.

3. The method of claim 2, wherein the one or more substitution parameters include a substitution parameter that includes a modifier that indicates the string type that should be used to encode the parameter value that is replaces that substitution parameter.

4. The method of claim 1, wherein retrieving the format string comprises retrieving the format string from a table.

5. The method of claim 4, wherein the table comprises one of a plurality of tables, each table associated with a different language; and
   further comprising selecting one of the tables using a language identified by the application.

6. The method of claim 1, wherein the requested string type comprises an American Standard Code for Information Interchange (ASCII) string type, a Unicode string type, or a Universal character set Transformation Format-8 (UTF8) string type.

7. The method of claim 1, wherein:
   the application comprises a first application; and
   the one or more destinations comprise at least one of a default output mechanism, a message box, the first application, a second application, and a log.

8. The method of claim 1, further comprising receiving the string identifier from the application in an Application Program Interface function call.

9. Logic embodied on at least one computer readable medium and operable when executed to:
   receive a requested string type, a string identifier, and one or more parameter values from an application;

retrieve a format string using the string identifier received from the application, the format string including text and one or more substitution parameters;

generate a text string using the retrieved format string by replacing the one or more substitution parameters in the format string with the one or more parameter values supplied by the application;

automatically encode the text string into string representation by (i) encoding at least the text in the text string according to the requested string type supplied by the application and (ii) encoding at least one of the one or more parameter values in the text string according to a string type different from the requested string type supplied by the application; and communicate the string representation to one or more destinations.

10. The logic of claim 9, wherein each of one or more substitution parameters indicates whether the parameter value that is substituted for that particular substitution parameter should be encoded according to the requested string type.

11. The logic of claim 10, wherein the one or more substitution parameters include a substitution parameter that includes a modifier that indicates the string type that should be used to encode the parameter value that is replaces that substitution parameter.

12. The logic of claim 10, wherein at least one of the one or more substitution parameters defines a specific string type that should be used to encode the at least one particular parameter value substituted for the at least one substitution parameters.

13. The logic of claim 12, wherein the logic operable to encode the text string into the string representation comprises logic operable to:
 encode the text string using the requested string type; and
 automatically overwrite the string representation for one of the parameter values based on the associated substitution parameter.

14. The logic of claim 9, wherein the logic is operable to retrieve the format string from a table.

15. The logic of claim 14, wherein the table comprises one of a plurality of tables, each table associated with a different language; and
 the logic is further operable to select one of the tables using a language identified by the application.

16. The logic of claim 9, wherein the requested string type is an American Standard Code for Information Interchange (ASCII) string type, a Unicode string type, and a Universal character set Transformation Format-8 (UTF8) string type.

17. The logic of claim 9, wherein:
 the application comprises a first application; and
 the one or more destinations comprise at least one of a default output mechanism, a message box, the first application, a second application, and a log.

18. A system for application text localization, comprising:
 a memory operable to store a table, the table comprising a plurality of format strings, each format string including text and one or more substitution parameters; and
 one or more processors collectively operable to:
 receive a requested string type, a string identifier, and one or more parameter values from an application;
 retrieve one of the format strings using the string identifier received from the application;
 generate a text string using the retrieved format string by replacing the one or more substitution parameters in the format string with the one or more parameter values supplied by the application;
 automatically encode the text string into string representation by (i) encoding at least the text in the text string according to the requested string type supplied by the application and (ii) encoding at least one of the one or more parameter values in the text string according to a string type different from the requested string type supplied by the application; and
 communicate the string representation to one or more destinations.

19. The system of claim 18, wherein each of the one or more substitution parameters indicates whether the parameter value substituted for that particular substitution parameter should be encoded according to the requested string type.

20. The system of claim 19, wherein the one or more substitution parameters include a substitution parameter that includes a modifier that indicates the string type that should be used to encode the parameter value that is replaces that substitution parameter.

21. The system of claim 18, wherein the table comprises one of a plurality of tables, each table associated with a different language; and
 the one or more processors are further collectively operable to select one of the tables using a language identified by the application.

22. The system of claim 18, wherein the requested string type is an American Standard Code for Information Interchange (ASCII) string type, a Unicode string type, and a Universal character set Transformation Format-8 (UTF8) string type.

23. The system of claim 18, wherein the application is operable to invoke one of a plurality of Application Program Interface functions, each Application Program Interface function associated with one of the string types.

24. The system of claim 16, wherein:
 the application comprises a first application; and
 the one or more destinations comprise at least one of a default output mechanism, a message box, the first application, a second application, and a log.

25. A method for application text localization, comprising:
 communicating a requested string type, a string identifier, and one or more parameter values to a facility, the string identifier identifying a format string that includes text and one or more substitution parameters;
 allowing the facility to (i) automatically generate a text string by replacing the one or more substitution parameters in the format string with the one or more parameter values, and (ii) encode the text string into string representation by (a) encoding at least one of the one or more parameter values in the text string according to a string type different from the requested string type; and
 receiving the string representation from the facility.

26. The method of claim 25, wherein each of the one or more substitution parameters indicates whether the parameter value that is substituted for that particular substitution parameter should be encoded according to the requested string type.

27. The method of claim 26, wherein the one or more substitution parameters include a substitution parameter that includes a modifier that indicates the string type that should be used to encode the parameter value that is replaces that substitution parameter.

28. The method of claim 25, wherein the one or more parameter values included one or more of a string, a pointer, a character, an integer, a long integer, a floating point number, or a double precision floating point number.

29. The method of claim 25, wherein communicating the string identifier to the facility comprises invoking an Application Program Interface function of the facility using a function call, the function call including the string identifier.

30. The method of claim 29, wherein the requested sting type is an American Standard Code for Information Interchange (ASCII) text string, a Unicode text string, or a Universal character set Transformation Format-8 (UTF8) text string; and invoking the Application Program Interface function comprises invoking one of a plurality of Application Program Interface functions, each Application Program Interface function associated with one of the string types.

31. The method of claim 25, wherein the facility comprises one or more software routines executed by at least one processor.

32. A system for application text localization, comprising:

an application operable to (i) generate a string identifier identifying a format string associated with a desired text string, wherein the format string includes text and one or more substitution parameters, (ii) generate one or more parameter values for inclusion in the desired text string, and (iii) identify a requested string type associated with the desired text string; and a message facility operable to (i) retrieve the format string from a file using the string identifier, (ii) automatically generate the text string by inserting the one or more parameter values into the retrieved format string in place of the one or more substitution parameters, (iii) automatically encode the text string into string representation by (a) encoding at least the text in the text string according to the requested string type supplied by the application and (b) encoding at least one of the one or more parameter values in the text string according to a string type different from the requested string type, and (iv) communicate the generated string representation to one or more destinations.

33. The system of claim 32, wherein each of the one or more substitution parameters indicates whether the parameter value that is substituted for that particular substitution parameter should be encoded according to the requested string type.

34. The system of claim 33, wherein the one or more substitution parameters include a substitution parameter that includes a modifier that indicates the string type that should be used to encode the parameter value that is replaces that substitution parameter.

35. The system of claim 32, wherein the at least one of the one or more substitution parameter defines the specific string type that should be used to encode the at least one particular parameter value substituted for the at least one substitution parameters as American Standard Code for Information Interchange (ASCII), Unicode, or Universal character set Transformation Format-8 (UTF8).

36. The system of claim 35, wherein the one or more processors collectively operable to encode the text string into the string representation comprise the one or more processors collectively operable to:

encode the text string using the requested string type; and
automatically overwrite the string representation for one of the parameter values based on the associated substitution parameter.

\* \* \* \* \*